Dec. 15, 1970  A. MASKERY  3,547,499
ELECTRICALLY CONTROLLED BRAKING OR ACCELERATING APPARATUS
Filed April 19, 1968  7 Sheets-Sheet 1
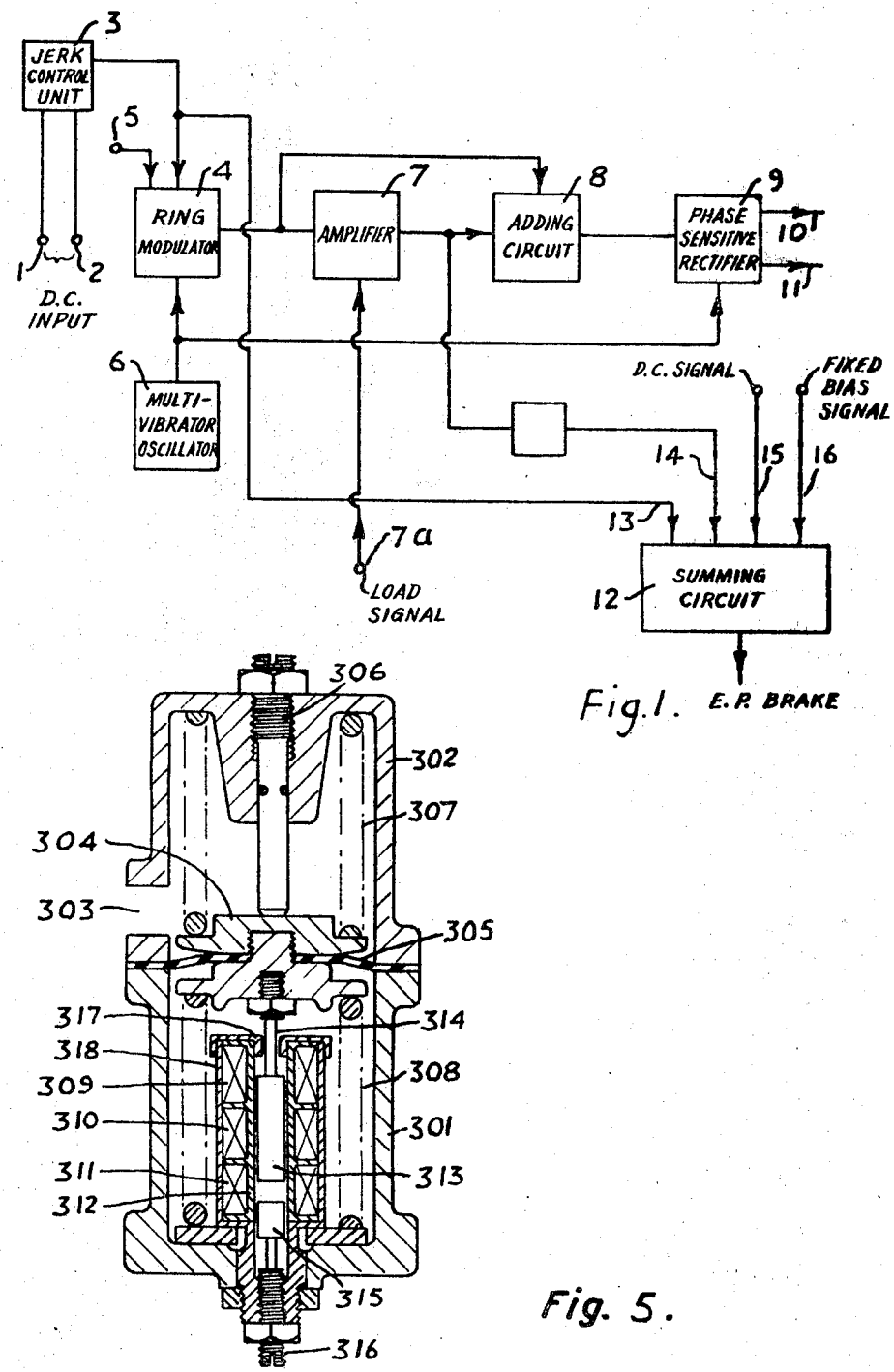

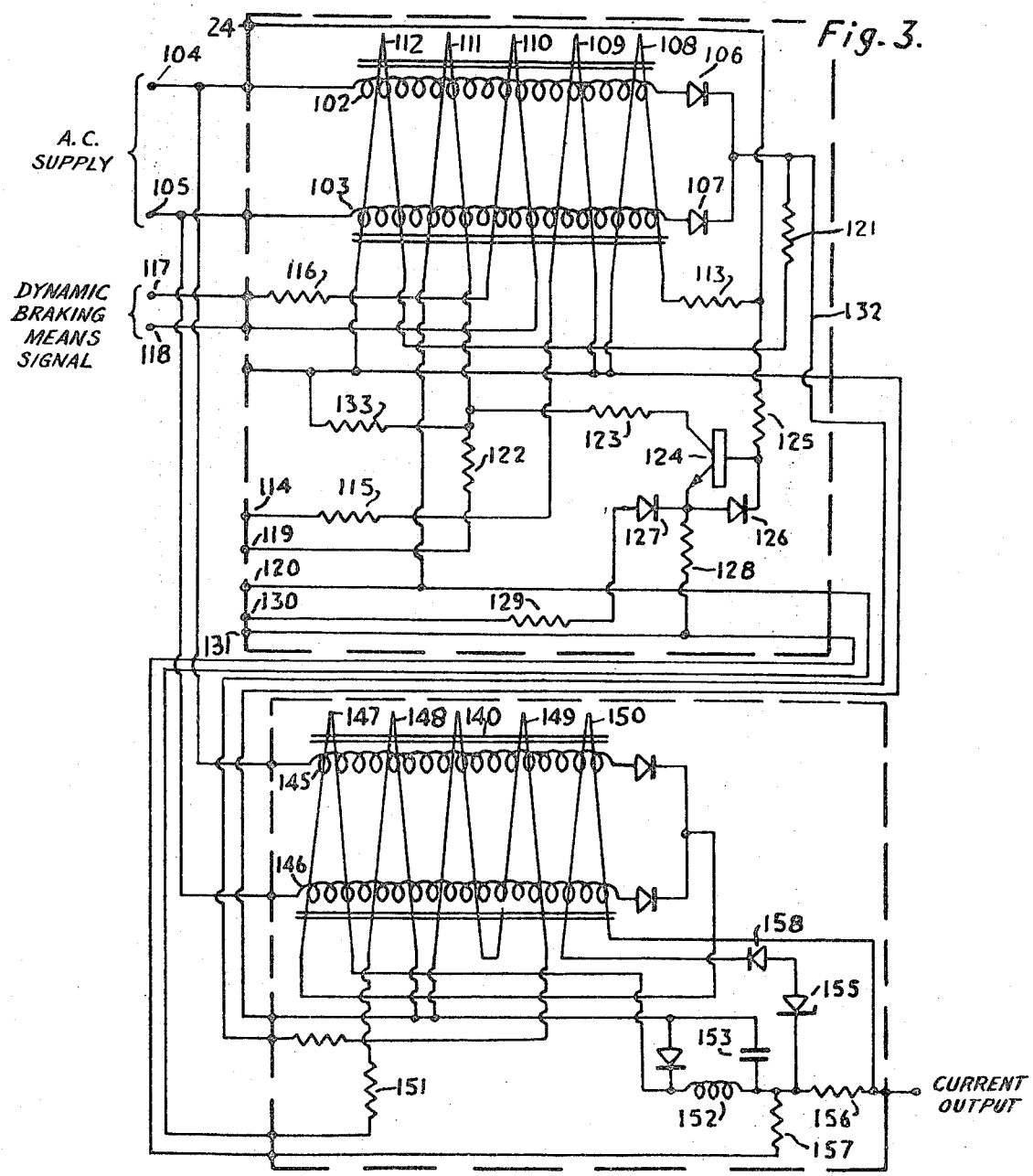

United States Patent Office 3,547,499
Patented Dec. 15, 1970

3,547,499
ELECTRICALLY CONTROLLED BRAKING OR ACCELERATING APPARATUS
Arthur Maskery, London, England, assignor to Westinghouse Brake and Signal Company, Limited, London, England
Filed Apr. 19, 1968, Ser. No. 722,608
Claims priority, application Great Britain, Apr. 26, 1967, 19,234/67
Int. Cl. B60t 8/02, 8/18
U.S. Cl. 303—21
14 Claims

ABSTRACT OF THE DISCLOSURE

An electrical analogue signal-controlled, vehicle braking control apparatus includes a dynamic braking arrangement responsive to an electrical command analogue signal corresponding to the braking force desired and a summing circuit which operates during braking in response to a command analogue signal and a signal corresponding to the actual braking produced, to produce an electrical signal used in controlling an additional braking arrangement so that any deficiency in the dynamic braking called for by the command analogue signal is compensated for.

Figure 2A:
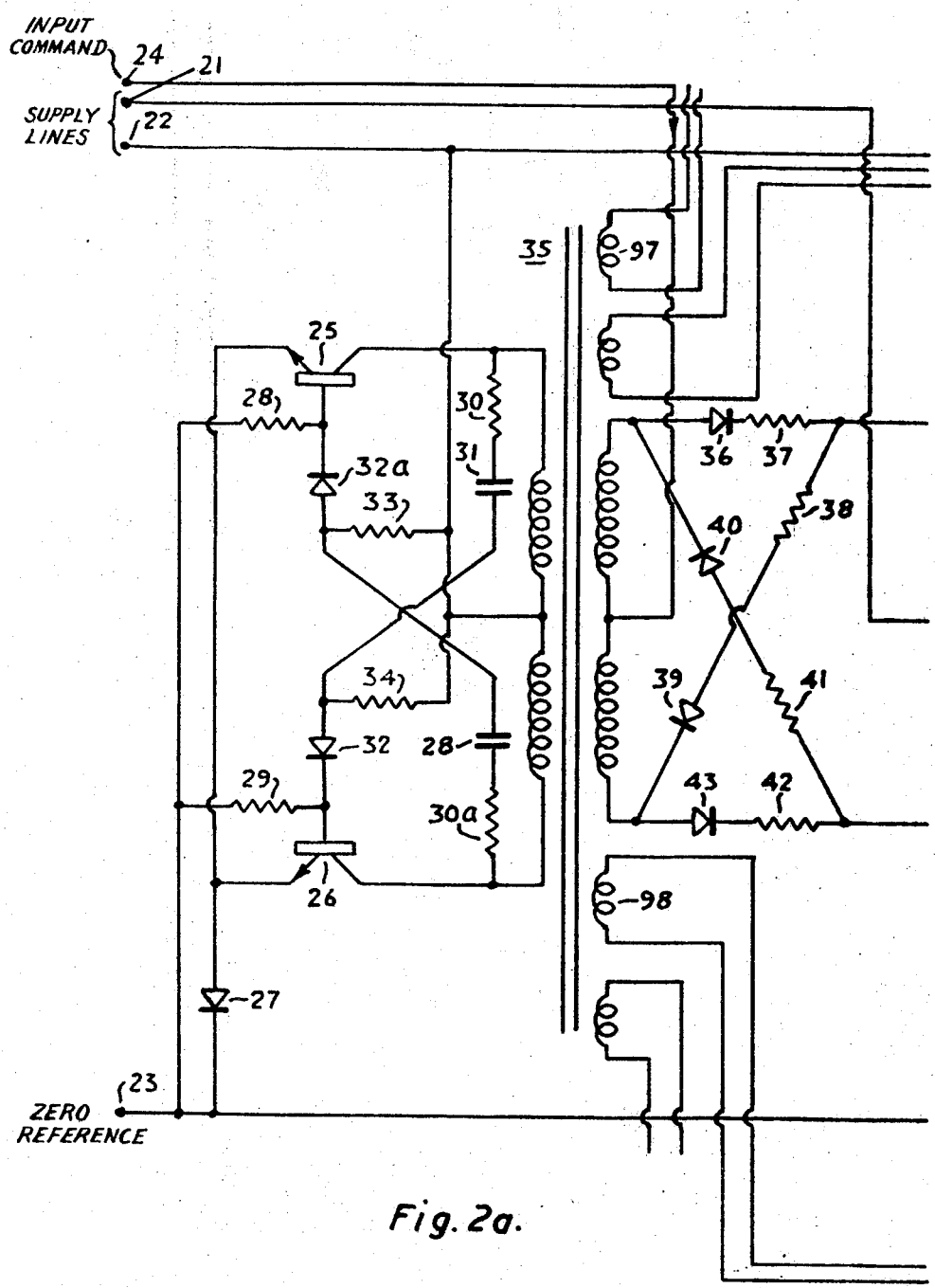

This invention relates to electrically controlled braking or accelerating apparatus and relates especially to apparatus which is responsive to an electrical analogue signal.

According to the present invention there is provided an electric analogue signal controlled vehicle braking control apparatus including dynamic braking means responsive to an electric command analogue signal indicative of a desired braking effort and summing means operable during braking to be responsive to the command analogue signal and an electrical signal indicative of the degree of dynamic braking produced to provide an electrical signal for controlling additional braking means to tend to make up any deficiency in the dynamic braking as called for by the command analogue signal.

The invention further provides electric analogue signal controlled vehicle braking control apparatus including means responsive to an electric command analogue signal indicative of a desired braking effort, means for applying a variable signal dependent thereon to a vehicle weight responsive amplifier to produce a weight dependent electric signal for addition to said variable signal to produce a load-weighted electrical signal for dynamic braking control means and summing means operable during braking to be responsive to the command analogue signal the weight dependent signal and an electrical signal indicative of the degree of dynamic braking to produce an electrical signal for controlling additional braking means to tend to make up any deficiency in the dynamic braking as called for by the sum of the weight dependent signal and the command analogue signal.

It is a feature of the invention that the load-weighted signal can have a parameter which is variable according to the value of the command analogue signal said parameter being indicative of whether the magnitude of the command analogue signal represents a degree of braking or a degree of traction and the apparatus may include means responsive to said parameter to condition the apparatus to provide dynamic brake or traction in accordance with the load weighted signal.

The said parameter may be a phase relationship relative to a reference A.C. signal and said means responsive to said parameter may be a phase sensitive rectifier.

The weight responsive amplifier preferably includes a pressure transducer to which fluid pressure from a load sensing means of the vehicle is applied to vary the magnitude of the variable signal to produce the weight dependent signal.

Further, electrical means is preferably provided when the additional braking means is electro-pneumatically associated with said summing means for, when the variable signal is indicative of a braking mode, applying a predetermined bias thereto such as to impose a restricted brake application by the additional braking means.

In addition, a coast region may be allocated to said command analogue signal between ranges thereof corresponding to a braking mode and corresponding to a traction mode.

Further, apparatus in accordance with the invention preferably embodies means for preventing more than an acceptable rate of change of the analogue signal. This is especially valuable to provide jerk control in apparatus for controlling braking and traction of rail vehicles to reduce mechanical stressing or passenger discomfort.

The present invention is especially but not exclusively applicable to equipment employing apparatus such as described in the U.S. patent application Ser. No. 600,799, now abandoned.

Figure 2B:
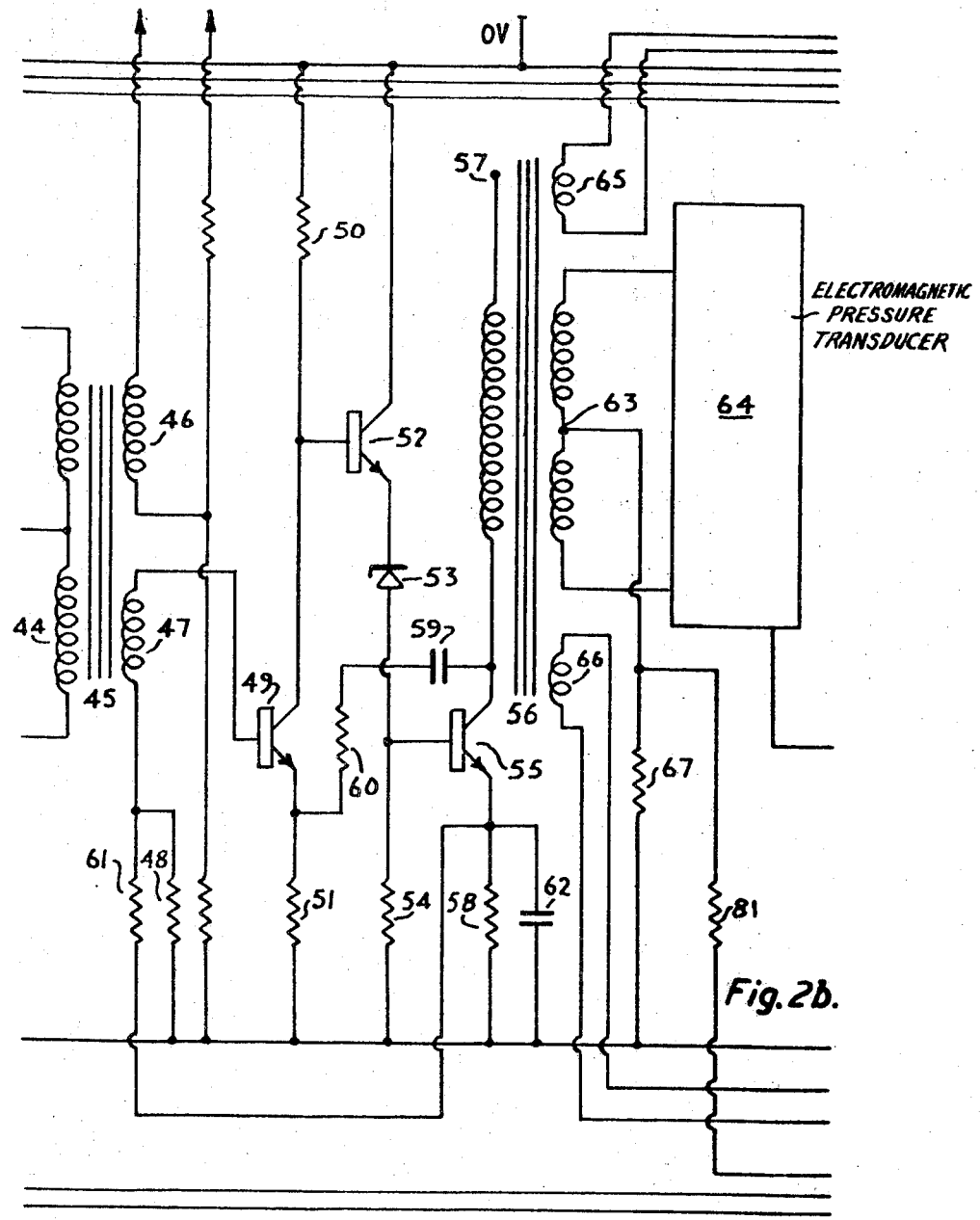
Figure 2C:
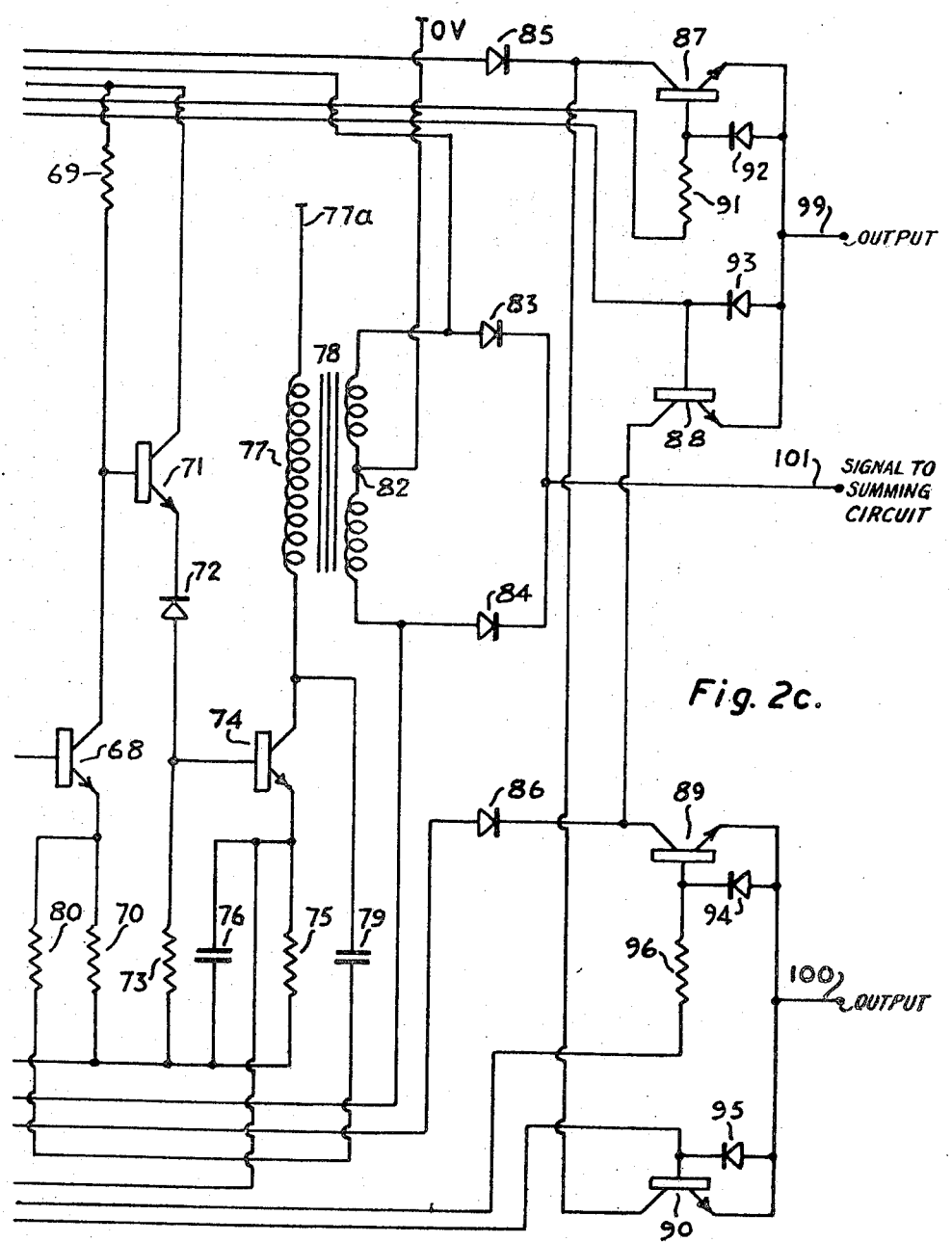
Figure 4A:
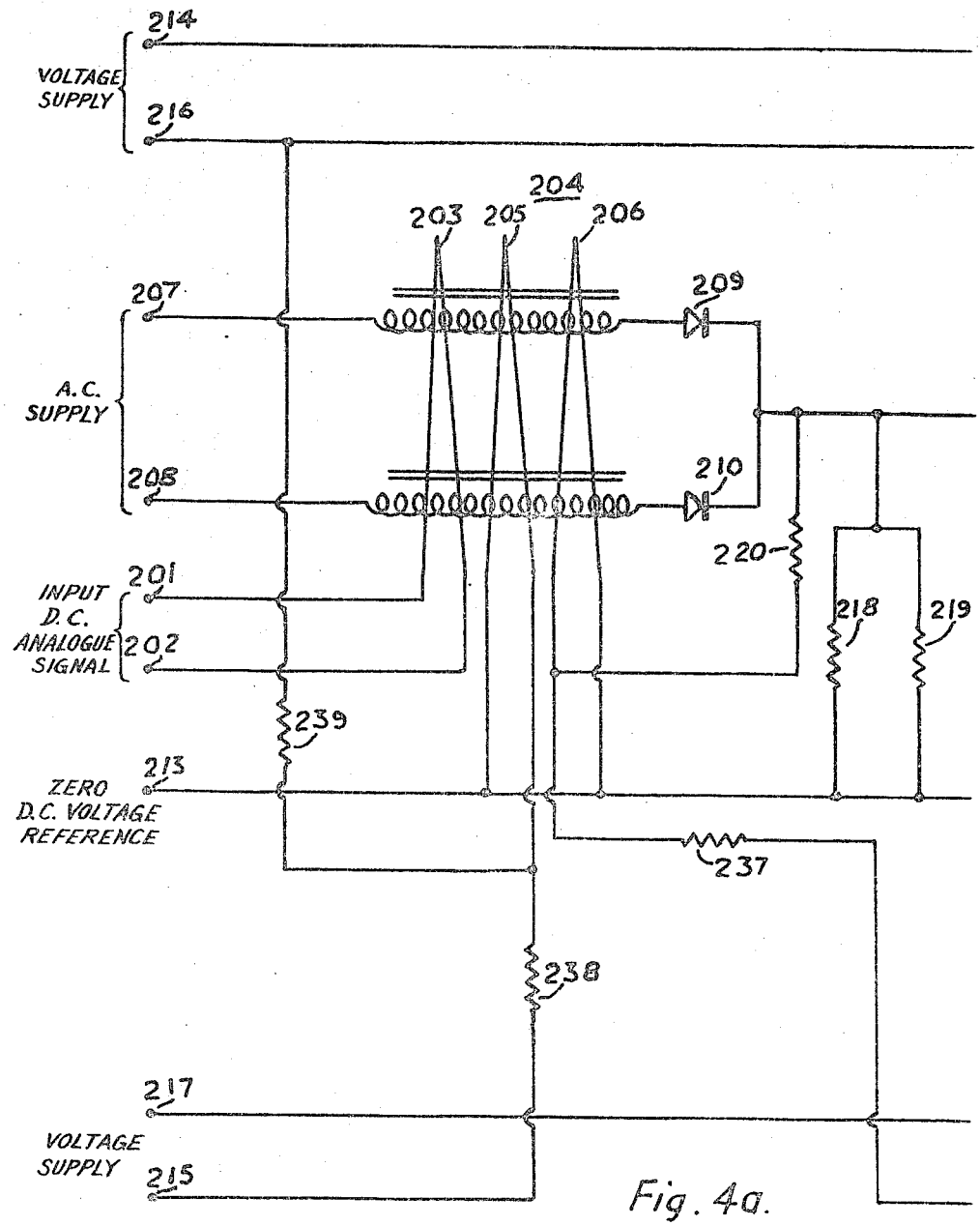
Figure 4B:
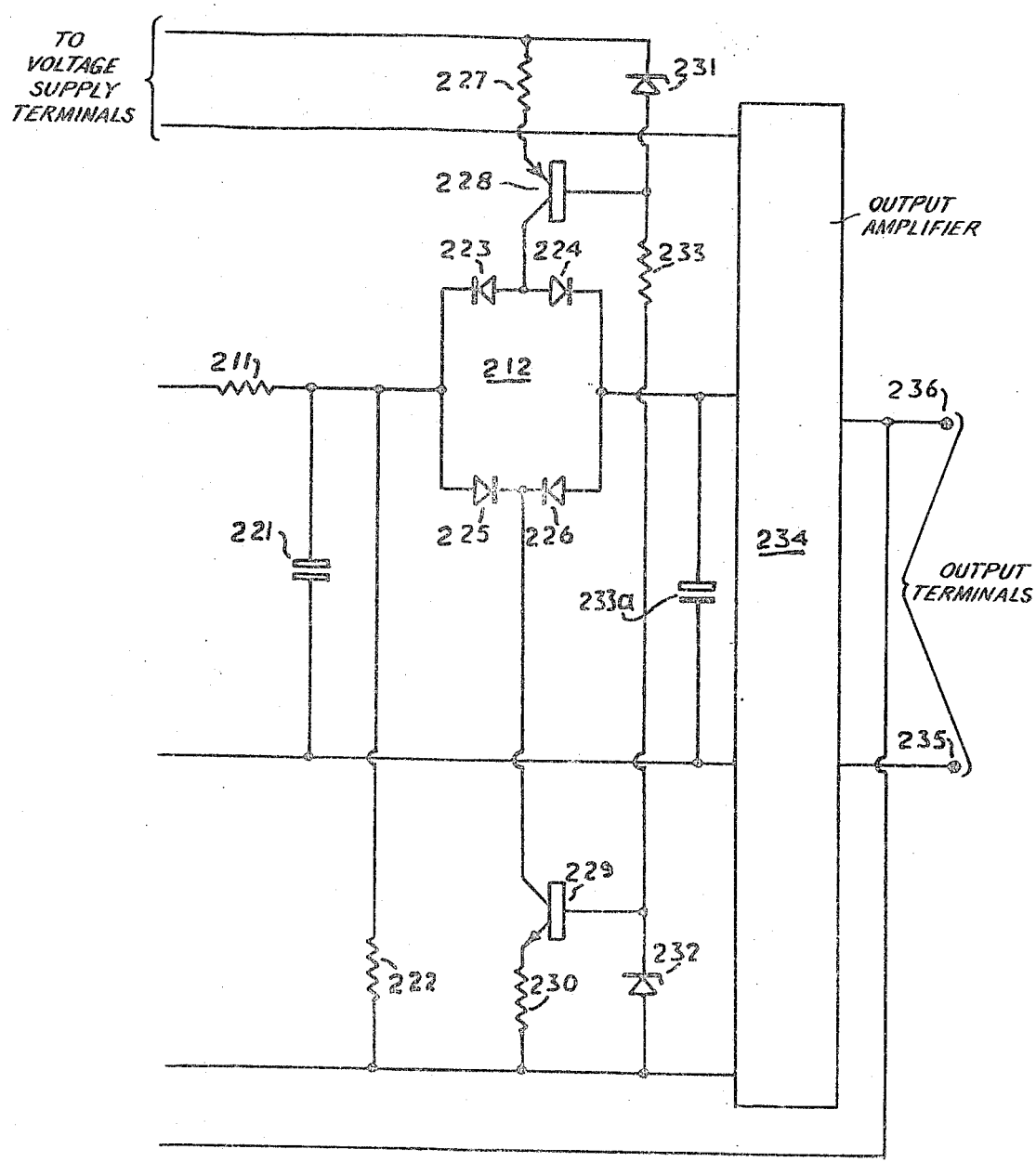

In order that the present invention may be more clearly understood and readily carried into effect the same will be further described by way of example with reference to the accompanying drawings in which:

FIG. 1 is a block diagram illustrative of the basic principles involved in the present invention, FIGS. 2a, 2b and 2c when placed together illustrate in greater detail a circuit arrangement for a load-controlled amplifier and related circuits for the equipment associated with one rail vehicle bogie, FIG. 3 illustrates a summing circuit and constant current ampliler for electropneumatic brake control in response to signals provided by the remaining circuits, FIGS. 4a and 4b placed together illustrate details of a jerk control circuit to be referred to hereafter and FIG. 5 illustrates a pressure transducer also to be referred to.

Before discussion of the specific embodiment of the invention to be described herein, it is to be understood that the present embodiment is a braking and traction control system operating in response to the magnitude of an applied D.C. current analogue signal and the apparatus is suitable for controlling the motored and braked axles of a train having a number of inter-connected cars. A D.C. command analogue signal is derived from a drivers control unit which forms no part of the present invention as such and is fed to each of the cars in series over a pair of conductors passing the full length of the train. It is preferably to employ a current analogue signal, as opposed to a voltage analogue signal, for the reason that it is possible to provide a constant current supply for the analogue signal but if one used a voltage analogue signal it would necessitate compensation for variation of overall voltage drop which occurs when a change in the number of cars in a train is effected.

It is also to be understood that the present system is arranged not only to control the electro-pneumatic braking facilities of the train and the traction facilities provided thereon but also to control dynamic braking, a deficiency in the dynamic braking being made up for by the electro-pneumatic braking.

Further, it will be appreciated that it is desirable to control the tractive effort applied to any given car by the motors on the respective bogies thereof and also in converse, the braking effective on those bogies, in accordance with the loading of the bogies. Accordingly, for each end of a car, load weighing equipment is assumed to be provided and this provides a fluid pressure dependent upon vehicle loading to a pressure transducer which modifies the degree of acceleration or the degree of braking individually for the individual bogies of cars in a train. Thus, it will be appreciated that while a particular current analogue signal is applied from the driver control equipment to all the cars on the train, the equipment associated with each bogie of each car modifies the response of the braking apparatus or traction apparatus in accordance with the loading experience thereat.

It is an important outcome of equipment in accordance with the present embodiment of the invention that in the unlikely event of failure of the load weighing equipment on a car or of electronic circuits associated therewith, the electro-pneumatic braking remains uneffected by virtue of the fact that the command analogue signal before application to the amplifier which includes the pressure transducer, is applied right round the whole of the equipment to the summing means so as to provide at least braking effort up to a set tare weight level.

Referring to FIG. 1, of the drawings, the terminals 1 and 2 are the input terminals for receiving a control D.C. current analogue signal and these are connected to a so-called jerk control unit represented by the block 3. This jerk control unit may be of a form to be described in greater detail hereafter with reference to FIG. 4, and is provided for ensuring that the command analogue signal cannot change at more than a predetermined acceptable rate regardless of the rate of change of the signal which is applied to the terminals 1 and 2. This is desirable for the two-fold reasons that firstly the braking must never be allowed to be so excessive as to cause substantial discomfort to passengers in a train and secondly, the currents applied to traction motors must also be limited such as to not command the motors to provide more than a predetermined degree of acceleration. Such excessive acceleration can cause not only discomfort to the passengers but over-loading of the traction motors and consequently highly expensive damage to the traction equipment. The output of the jerk control unit 3 is a D.C. analogue signal and in the present example is assumed to vary between 0 and 10 volts, the range 0 to approximately 5 volts corresponding to the braking range of control and the range from approximately 5 volts to 10 volts corresponding to the traction range of control. It will be understood here that maximum traction is attained at a value of the command analogue signal of 10 volts and maximum braking is attained at a value of the command analogue signal of approximately zero volts. The command analogue signal is applied to a so-called ring modulator 4, to a second input 5 of which there is also applied a five volt reference signal the purpose of which will become apparent hereafter. The ring modulator also receives a basic carrier frequency of 2.5 kc.'s from a multivibrator oscillator represented by the block 6. The variable signal output of the ring modulator consists of an A.C. the magnitude of which is dependent upon the degree of braking or acceleration called for by the command signal and the phase of which is dependent upon whether the signal represents braking or acceleration. This signal is applied to an amplifier 7 to which a load signal is applied at 7a such that the amplifier produces a weight dependent output signal and this signal is applied to an adding circuit represented by the block 8 to which the output of the ring modulator 4 is additionally applied. The combination of the amplifier 7 and the adding circuit 8 may be regarded as a multiplication circuit. The signal applied from the output of the modulator 4 to the adding circuit 8 can be regarded as the control signal for purely tare weight on the bogie in question and the amplifier output may be regarded as the extent to which this signal requires to be supplemented for added loading on the vehicle. The output of the adding circuit 8 is therefore an A.C. signal proportional to the required degree of braking or the required degree of acceleration for the portion of the train under consideration and this is, therefore, termed the load weighted signal. The phase of this signal is the parameter thereof detection of which determines whether the signal is a braking control signal or an acceleration control signal and this is determined by the phase sensitive rectifier 9 which has an output applied to it from the oscillator 6 and which determines whether the output should be on the line 10 for feeding to the dynamic braking control apparatus or to the line 11 for feeding to the traction control apparatus of the particular bogie of the car in question.

A summing circuit represented by the block 12 is provided the output of which controls the electro-pneumatic braking equipment of the particular bogie on the car in question and this receives a signal on the line 13 which is a D.C. signal proportional to the command analogue signal, a signal on the line 14 which is a rectified signal proportional to the load responsive signal received from the amplifier 7. A further signal is applied to the line 15 and this is a signal derived from the dynamic braking part of the control equipment and which is not described herein but is a D.C. signal indicative of the degree of dynamic braking being produced. A further bias signal is applied to the line 16 to provide, as referred to later, a basic restricted application of the electro-pneumatic brake for reasons which are well known in that it is always necessary to take up the slack etc. in the braking equipment before the brakes are actually effective. The summing circuit 12 therefore is arranged to be operative to blend the electro-pneumatic braking with the dynamic braking to provide the desired degree of braking in accordance with the sum of the signals appearing on lines 13 and 14.

It will be seen from the foregoing that in the event of the portions of the circuit consisting of blocks 7, 8 or 9 failing, the circuit 12 continues to receive a control signal in the form of the signal on line 13 and therefore the electro-pneumatic braking is effective to produce braking at least to the tare weight value.

Whilst the apparatus shown in FIG. 1 is intended to be present on each motored and braked car of a train to which the system is applied, the apparatus to the right of the ring modulator is required to be duplicated for each bogie of a car which is to be controlled. In the interests of simplicity, only apparatus appropriate to a single bogie has however been shown.

Referring now to FIGS. 2a, 2b, 2c and 3 which when placed together illustrate in greater detail the circuit arrangement which is shown in block form in FIG. 1, the circuit has two supply lines 21 and 22 which carry respectively the 5 volt reference which has already been mentioned and a positive supply of approximately 15 volts for the circuit, a zero reference being connected at terminal 23. The input command analogue voltage signal which is derived from the jerk control circuit which is not shown, is applied to the terminal 24.

Considering first the oscillator circuit, this consists essentially of two transistors of the n-p-n type represented by reference 25 and 26 these transistors have their emitters connected via a diode 27 which provides a slight bias in the "off" condition of transistors 25 or 26 to the zero reference line 23 and their bases are also connected to this line via respective resistors 28 and 29. The collector electrode of transistor 26 is cross-coupled via a resistor 30A a capacitor 28 and a diode 32A to the base electrode of transistor 25 and similarly the collector electrode of transistor 25 is cross-coupled via a resistor 30, a capacitor 31 and a diode 32 to the base electrode of transistor 26. The anodes of the diodes 32A and 32 are connected via respective resistors 33 and 34 to the positive supply line which is connected to the terminal 22. Further, the junctions of 33 and 34 are connected to a centre tapping on the primary winding of a transformer indicated generally by the reference 35 the outer terminals on which primary windings are connected to the collector electrodes of 25 and 26 as shown. The transistors 25 and 26 thus cross-coupled in such a manner and operate between the supply lines 22 and 23 as to provide a fixed voltage A.C. signal on the primary of transformer 35 this signal being adjusted to approximately 2.5 kc.'s.

The transformer 35 has a centre tapped secondary winding, the centre tap of which is connected to the command analogue signal input line 24 and the terminals of this winding are connected on the one hand via a diode 36, resistors 37 and 38 and a diode 39 and on the other hand via a diode 40, resistors 41 and 42 and a further diode 43. The connections if the last pair of diodes 40 and 43 are oppositely poled to the connections of the previous pair of diodes 36 and 39 with respect to the secondary winding of the transformer 35 and the junctions of resistors 37 and 38 and 41 and 42 respectively are connected to opposite ends of a centre tapped primary winding 44 of a further transformer 45. The latter transmorer has two secondary windings 46 and 47 as shown. As will be seen hereafter, the components associated with the scecondary winding of transformer 35 and the primary winding of transformer 44 operate to provide a ring modulator as previously referred to with reference to FIG. 1.

The secondary winding 47 of the transformer 45 is connected on the one hand via a resistor 48 to the zero line for the circuit and on the other hand to the base electrode of an amplifier transistor stage embodying the transistor 49 which has collector and emitter resistors 50 and 51 respectively. The collector electrode of transistor 49 is further connected to the base electrode of another transistor stage 52, the emitter electrode of which is connected via a Zener diode 53 and a resistor 54 to the zero reference line, the junction of 53 and 54 being connected to the base electrode of yet another transistor 55. The collector electrode of transistor 55 is connected via the primary winding of a transformer 56 to a 40 volt supply line at the point 57 as indicated and the emitter electrode of transistor 55 is connected via an emitter resistor 58 to the zero reference line. A resistance capacitance coupling via capacitor 59 and resistor 60 is made between the collector-electrode of 55 and the emitter electrode of transistor 49 as shown and further negative feedback path to stabilise the working point of the amplifier embodying transistors 49, 52 and 55 is provided via a resistor 61 to the junction of 45 and 48 as shown. The purposes of the feedback coupling from the collector electrode of transistor 55 is to provide A.C. feedback for the purposes of stabilising the gain of the amplifier.

The transformer 56 has a centre tapped secondary winding 63 the main terminals of which are connected to a suitable electromagnetic pressure transducer represented by the block 64 and described in greater detail hereafter with reference to FIG. 5. The transformer 56 also has two further secondary windings 65 and 66 which provide A.C. output signals for addition to the weight responsive signal for the purposes of providing a load weighed signal for controlling the dynamic braking of the traction of the car in question as will be described hereafter. The centre tape of the secondary winding 63 is connected via a resistor 67 to the zero reference line to provide a reference for this transformer and the output of the pressure transducer 64 is applied to the base electrode of a further transistor amplifier stage 68, the collector electrode of which is connected to the terminal 22 via a resistor 69 and the emitter of which is connected to the zero reference line via a resistor 70. The collector electrode of transistor 68 is further connected to the base electrode of another transistor stage of this amplifier and the transistor 71 the collector electrode of which is connected to the terminal 22 and the emitter electrode of which is connected via a diode 72 and a resistor 73 to the zero reference line via a resistor 75 across which there is connected a biassing capacitor 76. The collector electrode moreover of transistor 74 is connected to the aforementioned 40 volt supply line at terminal 76 via the primary winding 77 of yet another transformer 78. The gain of the amplifier comprising transistors 68, 71 and 74 is stabilised via a negative feedback path including capacitor 79 and resistor 80 from the collector electrode of transistor 74 to the emitter electrode of transistor 68. Further, the working point of the amplifier is stabilised by a D.C. connection between the emitter electrode of transistor 74 via resistor 81 to the centre tap of the secondary winding 63 of transformer 56.

As will be seen hereafter the signal developed in the primary winding 77 of transformer 78 is the weight responsive signal and the transformer 78 has a centre tapped secondary winding 82 which is included in a centre tapped rectifier arrangement embodying the rectifiers 83 and 84 as shown. The junction of the cathodes of 83 and 84 being connected together to provide an output which is one signal to be fed to the summing circuit.

The upper terminal of the secondary winding 83 is further connected via the aforementioned additional secondary winding 65 of the transformer 56 to a further diode 85 and similarly the lower terminal of the winding 82 is connected via the secondary winding 66 of 56 to another diode 86. The latter diodes co-operate respectively with pairs of transistors 87 and 88 and 89 and 90 to form phase sensitive rectifier arrangements for discriminating between A.C. signals indicative of required braking by dynamic braking and signals indicative of required traction. For this purpose, the cathode of diode 85 is connected to the collector-electrode of transistor 87 and also to the collector electrode of transistor 90. The emitter electrode of transistor 87 is connected in common with the emitter electrode of transistor 88 the collector electrode of which is connected to the cathode 86. Similarly, the base electrodes of the pair of transistors 87 and 88 are coupled together via a resistor 91 and an auxiliary secondary winding on the transformer 35 which, therefore, receives the basic oscillator frequency and phase. The emitter electrode of 87 is further connected to the base thereof via a diode 92 and a similar diode 93 is provided for transistor 88. Diodes 92 and 93 provide return paths for the base current of whatever transistor is on and thereby enables the two transistors 87 and 88 to be driven from one winding 97. Referring now to the other pair of transistors 89 and 90, these have bases and emitters connected via respective diodes 94 and 95 as shown and their bases are connected together via a resistor 96 and a further auxiliary secondary winding 98 on the transformer 35 to receive also the basic oscillator frequency. The output from the phase sensitive rectifier corresponding to a load weighted dynamic braking signal appears on the line 99 and the output of the phase sensitive rectifier corresponding to a load weighted traction signal appears on the line 100 the signal appearing on the line 101 is as aforementioned, the load responsive signal for application to the summing circuit for controlling the electro-pneumatic braking for blending with the dynamic brake. The summing circuit will be described in greater detail hereafter.

Referring now to the operation of the circuit arrangement as described so far, it will be appreciated that the apparatus as described is as for control of one bogie of a car of a train and the part of the apparatus which is coupled to the transformer winding 47 of transformer 45 is in practice duplicated and coupled to the transformer winding 46 for providing load-weighed control of braking and traction for the other bogie of the car of the train.

As aforementioned, the multi-vibrator formed around the transistors 25 and 26 produces a 2½ kc. A.C. signal which is applied over the transformer 35 to the secondary winding thereof incorporated in the ring modulator. It will be recalled moreover that the centre tapping of the winding 44 of transformer 45 is connected to the 5 volt reference source for the circuit. Further, by noting the polarity of the diodes 36 and 39 it will be appreciated that when the upper end of the secondary winding of 35 is positive relative to the lower end, the junction of equal resistors 37 and 38 acquires the potential of the centre tapping of 35 namely the command analogue signal voltage applied from the terminal 24. Depending therefore upon which way the command analogue voltage deviates from 5 volts, the potential of the centre tapping 44, so the phase of the variable A.C. signal in the windings 46 and 47 is either at 0° or 180° phase relationship to the output of the oscillator. Further, the magnitude of the voltage induced across windings 46 and 47 is proportional to the deviation from 5 volts of the command analogue signal.

Considering now the secondary winding 47, being that corresponding to the circiut for the bogie in question, the voltage induced in this winding is amplified via the transistor stages 49, 52 and 55 and provides an alternating current proportional thereto in the primary winding 57 of transformer 56 which produces an A.C. signal to the pressure transducer 64. The pressure transducer 64 is adjusted such that for normal tare weight loading on the bogie in question there is substantially no output to the amplifier, the first stage of which is 68 but as the loading of the vehicle is increased so the output signal 68 increases proportionately. The output of the pressure transducer therefore and the weight dependent signal may be regarded as the signal supplementation for the normal weight on the vehicle by loading the vehicle by passengers or otherwise. This signal is then amplified and produces an A.C. signal in the primary winding 77 of the transformer 78 to produce a corresponding A.C. voltage across the secondary winding 82. This signal is then rectified via diodes 83 and 84 to produce a weight responsive signal in the line 101 which is connected to the summing circuit yet to be described.

Considering now the transistors 87 and 88, these transistors receive a base drive from one of the aforementioned auxiliary windings on the transformer 35 in accordance with the basic oscillator phase and frequency and therefore the transistors 87 and 88 receive a base drive alternately at the basic frequency. Further, it will be recalled that the diode 85 is forward biassed on appropriate half cycles of the signal received from the transformer 65 and from the transformer 78. Accordingly, only when the phase relationship between the signals received from the transformer 35 and the transformer 56 are in appropriate phase relationship is to be determined does the current through the rectifier 85 pass through the transistor 87 to provide the corresponding half cycle of a dynamic braking signal on the line 99. Similarly, only when the same conditions exist, does the other half cycle pass via the recetifier 86 and the transistor 88 to the line 99. When the phase relationship between the signals in transformers 56 and 78 and the transformer 35 is the opposite to the previously described relationship, the transistors 89 and 90 are operative respectively to conduct the respective half cycles via the rectifiers 86 and 85 to provide an acceleration or traction signal in the line 100. Dependant therefore on the phase relationship between the load responsive signal and the basic oscillator frequency a signal is produced in the output lead 99 or 100. Since moreover the signal induced in the winding 65 or 66 is proportional in magnitude to the unload-weighted command analogue voltage signal derived from the terminal 24, the output derived at the line 99 or 100 is proportional to the sum of this signal and the load responsive signal induced in the winding 82. The transformation ratios of the transformers of course, are suitably selected to achieve this end. The outputs appearing on line 99, 100 and 101 are in practice applied to buffer amplifiers but these may be of suitable form and will not be described in detail herein. The outputs of these amplifiers are then utilised for control purposes and the outputs of 99 and 100 after amplification in the buffer amplifiers are applied to the summing circuit in which blending of the dynamic and E.P. braking is achieved.

Referring now to the summing circuit, this is illustrated in greater detail in FIG. 3 of the drawings. The summing circuit consists basically of a transductor having a pair of A.C. windings 102 and 103 connected to receive an A.C. supply from a suitable inverter which is not shown but which is connected to terminals 104 and 105 as shown. The transductor has the opposite ends of the windings 102 and 103 connected together via respective rectifiers 106 and 107 and the transductor has five D.C. control windings 108 and 112 as shown. The command analogue voltage signal at the terminal 24 as previously mentioned is connected via a resistor 113 to the control winding 108 of the transductor and the load responsive signal derived from the line 99 previously referred to is applied to the winding 109 of the transductor via a terminal 114 and a resistor 115. The winding 110 of the transductor is connected via a resistor 116 to terminals 117 and 118 to receive a signal from the dynamic braking means of the particular bogie of the train in question, indicative of the degree of dynamic braking being produced at any instant of time. Further, a bias is applied to the transductor via the control winding 111 from the terminals 119 and 120 which are at −24 volts and +15 volts respectively. The final control winding of the transductor namely, 112 is arranged via a resistor 121 to receive a set degree of D.C. feedback from the output of the circuit to achieve stability of operation.

In addition to the aforementioned fixed bias applied to the bias winding 111 of the transductor a further bias is applicable via a resistor 123 and the collector emitter path of a transistor 124. Components associated with this transistor are resistor 125, diodes 126 and 127 and resistors 128 and 129 connected as shown. The terminals to which resistors 128 and 129 are connected, namely, terminals 130 and 131, are at +5 volts and −12 volts respectively.

In operation of the summing circuit the transductor and associated components are so adjusted that the basic command analogue signal at the coast level that is the level which neither calls for braking nor traction, namely, 5 volts, gives rise to a transductor output voltage in conjunction with the bias derived via the resistor 133, of 6 volts. However, the additional bias imposed by the conducting condition of the transistor 124 increases this output to 8 volts in the coasting condition for the equipment. As the magnitude of the voltage analogue signal at the terminal 24 reduces to command a braking application that is it reduces from 5 volts towards the zero level, the output from the circuit on line 132 begins to fall and when the signal at 24 reaches approximately 4.6 volts, the transistor 124 becomes non-conducting and removes some of the bias from the winding 111 thereby reducing the output to provide immediately a restricted application which takes up the slack in the electropneumatic brake mechanism at an output of approximately 6 volts on the line 132. From then onwards towards the zero voltage level for the signal at the terminal 24, the output voltage on the line 132 reduces steadily towards the full electropneumatic brake application condition.

Considering the extreme case now where the dynamic brake is providing the full demanded braking effort that is the input on the D.C. winding 110 on the transductor balances the combined signals on the windings 108 and 109, the signals exactly match and the voltage on the output line 132 remains at the restricted application level of 6 volts.

Considering now the other extreme case where there is no dynamic brake application and considering that the signal at the terminal 24 moves form the 5 volt level, one passes through the restricted application region at which the output on the output line 132 is 6 volts and the region 5 volts to 4.6 volts input at 24 provides a minimum coasting area of control for the driver. The output derived on the line 132 is then proportional to the sum of the ampere turns of the windings 108 and 109 on the transductor and the output on line 132 falls towards the maximum braking level as the voltage at terminal 24 reduces still further.

As mentioned previously, if the load responsive signal which energises the winding 109 fails, one is left with the variable signal on the winding 108 corresponding to the unload weighted command analogue signal and, therefore, even in the event of failure of the load weighing part of the circuit, the light loaded braking component still remains to give an electro-pneumatic braking application.

It will be recalled that apparatus in accordance with the present invention may be employed in conjunction with braking apparatus such as described in co-pending patent application No. 600,799. In the event of an electro-pneumatic converter of the type described in that specification being empolyed, it may be desirable to ensure that the ampere turns of the converter are substantially independent of the temperature co-efficient of impedance presented by the coil of the converter. Accordingly, the output appearing on the line 132 of the summing circuit just described is applied to a constant current amplifier circuit based on a further transductor 140.

The transductor 140 has a construction similar to that of the summing circuit, having two A.C. windings 145 and 146 and four D.C. control windings 147, 148, 149 and 150. The winding 147 provides load current negative feedback; winding 148 has a 15 volt bias source connected to it via a resistor 151 to set the working point for the amplifier; winding 149 receives the input signal from line 132 and winding 150 is connected as a negative feedback winding taking its voltage across the resistor 156. The latter feedback path is via a zener diode 155 and is operative during braking but provides current limiting during traction. The current output of the cicuit is derived via the filter comprising inductance 152 and capacitor 153 from the line 156. The resistor 157 moreover, being returned to the minus 12 volt terminal 131, introduces a negative current corresponding to the magnetization current of the transducer into the output in order that the current as applied to the converter may be reduced to zero. The filter provides smoothed D.C. output.

Considering this constant current amplifier in slightly more detail, the signal applied to the line 24 of the summing circuit rises to say +10 volts during an acceleration and the output on the line 132 may rise to something more than 8 volts and calling for a current in the electro-pneumatic converter in excess of that which is required to turn it off. In order to avoid overheating in the converter coil, this current is preferably restricted to about 600 ma. The resistor 156 whose value may be about 12.5 ohms and which is in series with the converter coil, has a voltage across it proportional to the converter current and provides feedback via winding 150 as referred to above. Diodes 155 and 158 start to conduct at approximately 7.4 volts corresponding to 590 ma. of converter current, the diode current passes through winding 150 which is arranged to give additional negative feedback to tend to limit the output current.

Considering now the greater detail of the jerk control block 3 of FIG. 1, and referring to the drawing of FIG. 4 an input D.C. analogue signal from the drivers control unit is applied to the terminals 201 and 202, these terminals being connected to a D.C. control winding 203 on a transductor represented by the general reference 204. The transductor 204 also has two further D.C. biassing windings 205 and 206 as shown and these will be referred to hereinafter. The A.C. windings of the transductor 204 are connected to input terminals 207 and 208 to which an alternating current supply in the present example 224 volts, 400 cycles per second, is connected. The output side of the transductor main windings are connected to rectifiers 209 and 210 as shown to provide a direct current output via a resistor 211 to an arrangement of diodes represented by the general reference 212. A zero D.C. voltage reference for the circuit is connected to the terminal 213 and the circuit is also provided with supply voltages of minus 24 volts and plus 24 volts at the terminals 214 and 215 as shown and plus 15 volts and minus 12 volts at the terminals 216 and 217. A pair of resistors 218 and 219 are connected between the outputs of diodes 209 and 210 and the zero volts line for the circuit and a feedback resistor 220 is connected between the latter output and one terminal of the further winding 206 on the transductor the other terminal of this winding being connected to the zero volts line. Between the output side of the resistor 211 and the zero volts line there is connected a capacitor 221 of relatively low value and also between this output and the minus 12 volts line a further resistor 222 is connected.

The arrangement of diodes 212 consists of four diodes 223, 224, 225 and 226 respectively arranged in a bridge configuration, the diodes 223 and 224 being back-to-back and the diodes 225 and 226 being back-to-back such that assuming all the diodes are biased to conduct, a series D.C. current path is provided from the terminal 214 via a resistor 227, transistor 228, transistor 229 of opposite type to 228 and a further resistor 230 to the minus 12 volts line connected to the terminal 217. The conditions of the transistors 228 and 229 are determined by Zenor diodes 231 and 232 connected in their base emitter paths, these diodes being connected in a series path including a further resistor 233 between the lines connected to terminals 214 and 217 respectively. The junction of diodes 224 and 226 is connected to one terminal of a storage device in the form of a relatively large capacitor 233a, the other terminal of which is connected to the zero volts line for the circuit. Further, the capacitor 233a has connections to an output amplifier circuit represented by the block 234. One output of the amplifier consists of a continuation of the zero volts line to output terminal 235 and the other output terminal, the output of which varies in accordance with the input to the circuit, is represented by 236 and has a feedback connection via a resistor 237 also to the further winding 206 of the transductor referred to previously. The amplifier 234 may be of any suitable form providing a stable output in response to the input signal voltage across the capacitor 233a and in view of the fact that feedback is taken from the output of the amplifier, it is necessary to supply the amplifier from the supply lines to the remaining part of the circuit and connections are, therefore, shown from the terminals 216 and 217 for this purpose. In addition, in order that the transductor 204 may have a predetermined operating point, that is, it may be adjusted such, for example, to give a zero output for a zero input, the further biassing winding 205 is connected via respective resistors 238 and 239 to the supply voltages at terminals 215 and 216 as shown, to provide a reference bias on the transductor.

In operation of the circuit arrangement shown in the drawing of FIG. 5 the direct current analogue signal is applied to the winding 205 of the transductor and thereby influences the magnitude of the alternating current to which the transductor can be responsive and the output of the transductor being supplied via diodes 209 and 210 becomes a direct current voltage across the capacitor 221 and is applied to the junction of diodes 223 and 225 of the diode arrangement 212. Assuming initially that the voltage across the relatively low capacitor 221 and the relatively high value capacitor 233a are the same, the diodes 223, 224, 225 and 226 are biassed into the conducting condition and carry the emitter collector current for the transistors 228 and 229 between the supply lines connected to terminals 214 and 217. In the event of a sudden rise in the analogue signal applied to the transductor 204, the output of the transductor increases proportionately and produces a proportionate increase of voltage on the capacitor 221. Since there is no instantaneous change of voltage across the capacitor 233a, the diode 223a becomes biassed into the non-conducting condition and current flows via the collector emitter path of the transistor 228 into the capacitor 233a until the voltage on the capacitor 233a has attained a value which is substantially equal to the voltage from the capacitor 221. During this current flow the diode 226 is similarly biassed to the diode 223 and in view of this it is non-conducting whereas the diode 225 is biassed into the conducting condition. Since, however, the emitter conductor output impedance of the transistor 229 via the resistor 230, which is of substantially high value compared with the resistor 211, virtually no appreciable current flows into the transistor 229 from the capacitor 221.

Taking now a condition under which a sudden reduction in voltage occurs, across the capacitor 221 due to a sudden reduction in the D.C. current analogue signal applied to the winding 203 of the transductor, if this change takes the voltage of the capacitor 221 below that of the relatively large capacitor 233a, the diode 225 is now biassed into the non-conducting condition and carries current via the transistor 229 to the capacitor 233a. From the point of view of the capacitor 233a, this current is of opposite sense to the current flow which took place previously as described above via the diode 224 and, therefore, a reduction of voltage across the capacitor 233a takes place until the point is reached at which the voltages across the capacitors 221 and 233a are again substantially equal.

Since the transistor 228 and 229 have mixed control potentials applied to them, the control of the emitter collector paths being across the Zener diodes 231 and 232, these transistors operate as constant current devices and therefore, the paths via which the capacitors 233a is charged or discharged in accordance with the sense of variation of the voltage across the capacitor 221, are constant current circuits. The circuit values may, therefore, be chosen such that whatever the rate of change of the analogue signal applied to the terminals 201 and 202 of the circuit, the voltage across the capacitor 233a changes at a predetermined rate.

Clearly, in the foregoing, the forward voltage drops which are present during the conduction of the diodes 224 or 226 as discussed in the foregoing have been ignored and it will be appreciated that if the circuit values are appropriately chosen, these forward voltages can only give rise to an insignificant discrepancy between the values of the voltages developed across the capacitors 221 and 233a in a rest condition for the circuit.

The feedback path from the terminal 236 to the winding 206 of the transductor provides for increased stability of the circuit and also stability of the transductor itself is achieved by the addition of feedback via the resistor 220.

Referring in greater detail to the transducer of block 64 of FIG. 2b, and as shown in FIG. 5, the transducer of FIG. 5 comprises an outer casing made up of two sections 301 and 302. The section 1 contains the main electrical component of the transducer and the section 302 is in the form of an air-tight chamber having an input port 303 connected to receive pressure according to vehicle bogie loading via which fluid pressure can be applied to the upper surface of a pressure responsive member 304. The pressure responsive member 304 is sealed into the device by means of a diaphragm 305 which is clamped between 301 and 302. The section 302 is also provided with a threaded member 306 which can be screwed into or out of 302 from the outside if desired to exert a desired force independently of the pressure at 303 on the pressure responsive member 304. With no pressure exerted by 306, pressure responsive member 304 is balanced between two substantially equal springs 307 and 308 in the upper and lower parts of the device so that movement of 304 is substantially linear with increase of pressure in the upper enclosure, the lower enclosure being assumed to be at atmospheric pressure. The springs 307 and 308 are pre-loaded on assembly by an amount greater than the maximum storke under pressure of the pressure responsive member 304, so that at full stroke both springs are still in a compressed state.

In the lower enclosure formed by the portion 301, there is a differential transformer arrangement comprising three windings 309, 310 and 311 as shown. These windings are substantially co-axial and mounted on a non-magnetic former 312. The upper and lower windings 309 and 311 are primary windings of the transformer arrangement and are arranged to be conencted in flux opposition with respect to each other. Winding 310 is the secondary or output winding of the transformer arrangement. The core of the transformer arrangement is made up of a central movable member 313 which is of sufficient length to extend through the central winding 310 and into the primary windings 309 and 311 as shown. This member is attached via a stem 314 to a threaded stud which is screwed into the lower part of the pressure responsive member 314. The core of the transformer also comprises a lower pole piece 315 which is adjustable by means of a screw adjustment 316 in the lower part of the arrangement which extends into the lower primary winding 311 and can be locked in any desired position. Also a further pole piece 317 is provided which is integral with an outer casing 318 of magnetic material of the transformer arrangement as shown. Air gaps are provided between the pole pieces 315 and 317 to allow for movement of the centre member 313 with the pressure responsive means 314.

In operation of the transducer, it is assumed that an alternating signal of sufficient frequency is applied to 309 and 311 so that the fluxes produced thereby are in opposition with respect to each other and with no load on the vehicle bogie the core portion 313 is symmetrically disposed with respect to the windings 309 and 311, the magnitude of the output signal derived from 310 is thus ideally zero. Movement of 313 towards the lower pole piece 315 of the transformer arrangement then increases the flux linkage of 311 with 9 and reduces that of 310 with 309 and an alternating output signal is derived from 310 the magnitude of which varies in approximately linear manner as the loading increases.

Having thus described our invention what we claim is:

1. An electrical analogue signal-controlled, vehicle braking control apparatus for a braking system including dynamic braking means responsive to an electrical command analogue signal, traction means and additional braking means, said apparatus comprising means for receiving an electrical signal indicative of the degree of dynamic braking produced by said dynamic braking means and summing means, including a first input for receiving the command analogue signal and a second input connected to said means for receiving said signal indicative of the degree of dynamic braking produced, for producing an output control signal for controlling said additional braking means so that any deficiency in the dynamic braking dictated by said command analogue signal is compensated for.

2. An electrical analogue signal-controlled, vehicle braking control apparatus comprising dynamic braking means responsive to an electrical command analogue signal indicative of a desired braking effort, additional braking means, and electrical control means comprising means for producing an electrical signal indicative of the degree of dynamic braking produced and summing means, including a first input for receiving said command analogue signal and second input for receiving said electrical signal, for producing an output control signal for controlling said additional braking means so that any deficiency in the dynamic braking dictated by said command analogue signal is compensated for.

3. An electrical analogue signal-controlled, vehicle braking control apparatus for a braking system comprising dynamic braking means and additional braking means, said control apparatus comprising means responsive to an electrical command analogue signal indicative of a desired braking effort for producing a variable electrical signal in accordance therewith, an amplifier, responsive to a vehicle weight responsive signal and to said variable electrical signal, for producing a weight dependent electrical signal, dynamic braking control means, including adding means for adding said variable electrical signal to said weight dependent electrical signal, for producing a load-weighted electrical signal for controlling said dynamic braking means, and summing means, responsive to said command analogue signal, said weight dependent signal, and an electrical signal indicative of the degree of dynamic braking, for producing an output control signal for controlling said additional braking means so that any deficiency in the dynamic braking dictated by the sum of the weight dependent signal and the command analogue signal is compensated for.

4. An apparatus as claimed in claim 1 wherein said variable signal comprises a tare weight signal.

5. An apparatus as claimed in claim 1 wherein said electrical analogue signal is variable over a range of values, one part of said range being indicative of a desired braking effort and another part of said range being indicative of a desired accelerating effort to be produced.

6. An apparatus as claimed in claim 3 wherein said variable signal comprises an A.C. signal.

7. An apparatus as claimed in claim 6 wherein said amplifier includes a pressure responsive differential transformer.

8. An apparatus as claimed in claim 5 wherein said variable signal includes a parameter dependent upon the part of the range of values in which the command analogue signal falls.

9. An apparatus as claimed in claim 8 further comprising means for producing a reference A.C. signal, said parameter being the phase of the A.C. signal in relationship to said reference A.C. signal.

10. An apparatus as claimed in claim 9 wherein said dynamic braking control means further includes a phase sensitive rectifier circuit responsive to the phase of said added weight dependent signal and the variable electrical signal for producing dynamic braking in accordance therewith when a predetermined phase relationship exists with respect to the reference A.C. signal.

11. An apparatus as claimed in claim 1 wherein said summing means includes a magnetic amplifier having D.C. windings to which respective signals to be summed are applied in approximately poled D.C. form.

12. An apparatus as claimed in claim 1 further comprising a jerk control circuit for controlling the rate of change of the electrical command analogue signal.

13. An apparatus as claimed in claim 12 wherein said jerk control circuit comprises a constant current circuit, an output storage device, and means responsive to a non-correspondence between the output signal voltage of the storage device and an input command analogue signal for causing the constant current circuit to feed current to said storage device.

14. An apparatus as claimed in claim 13 wherein said jerk control circuit includes first and second constant current circuits, said first constant current circuit being operable, in response to an increase of the input signal producing such a non-correspondence between the input signal and the output signal voltage, to feed current in one direction to said storage device and said second constant current circuit being operable, in response to a decrease an input signal providing such a non-correspondence between the input signal and output signal voltage, to feed current in the other direction.

References Cited

UNITED STATES PATENTS

| | | | |
|---|---|---|---|
| 3,398,815 | 8/1968 | Brath et al. | 303—22 |
| 3,398,993 | 8/1968 | Sarbach et al. | 303—20 |

DUANE A. REGER, Primary Examiner

U.S. Cl. X.R.

303—3, 20, 22